ELECTRICAL IDENTIFICATION CIRCUIT

Filed Feb. 4, 1957 8 Sheets-Sheet 1

*Inventor*
S. SIMON -
J. ROSENOER
*By* [signature]
*Attorney*

Inventor
S. SIMON -
J. ROSENOER
By Albert Reis
Attorney

ELECTRICAL IDENTIFICATION CIRCUIT

Inventor
S. SIMON -
J. ROSENOER
By Albert Rees
Attorney

ELECTRICAL IDENTIFICATION CIRCUIT
Filed Feb. 4, 1957 8 Sheets-Sheet 4
FIG. 12.
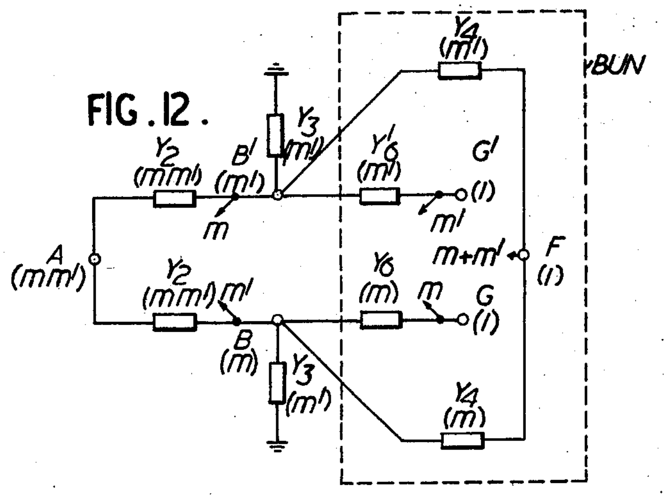
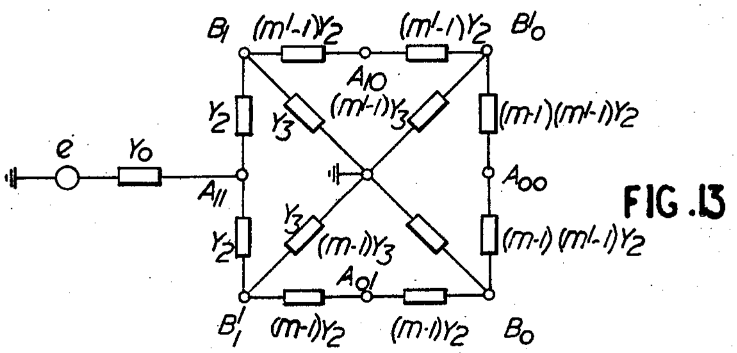
FIG. 14.
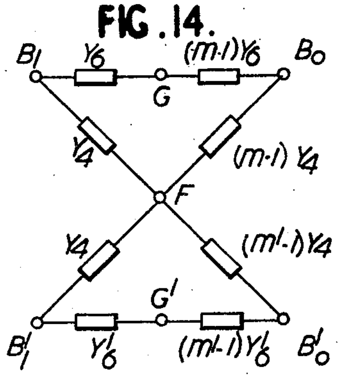
FIG. 15.
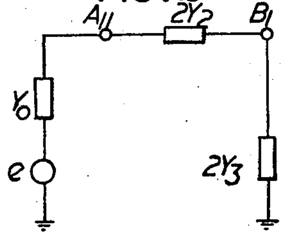
*Inventor*
S. SIMON -
J. ROSENOER
*By* Albert Reiss
*Attorney*

Inventor
S. SIMON -
J. ROSENOER
By Albert Reis
Attorney

*Inventor*
S. SIMON -
J. ROSENOER
*By* [signature]
*Attorney*

Inventor
S. SIMON -
J. ROSENOER
By [signature]
Attorney

ELECTRICAL IDENTIFICATION CIRCUIT

Filed Feb. 4, 1957 8 Sheets-Sheet 8

Inventor
S. SIMON –
J. ROSENOER
By [signature]
Attorney

United States Patent Office 2,954,439

Patented Sept. 27, 1960

2,954,439

ELECTRICAL IDENTIFICATION CIRCUIT

Stephane Simon and Jacques Rosenoer, Antwerp, Belgium, assignors to International Standard Electric Corporation, New York, N.Y., a corporation of Delaware Filed Feb. 4, 1957, Ser. No. 638,089

Claims priority, application Belgium Feb. 10, 1956

9 Claims. (Cl. 179—18)

The invention relates to an electrical identification circuit.

More particularly, the invention relates to an electrical identification circuit including a plurality of input circuits each of which is connected to a combination of output circuits characterising the input circuit, by means of a network of passive elements constituted by impedances. By means of such a network, when an A.C. energy source is applied to one of the said input circuits, energy will be transmitted to each of the circuits whose combination characterises the input circuit to which the A.C. energy source is applied. The output circuits will each include a detecting device in order to react to the application of the A.C. energy which reaches it, and to operate any bistable device such as a relay in order to cause a registration of the identity of the input circuit to which the energy source has been applied, by the simultaneous operation of a relay combination corresponding to the activated input circuit.

An identification circuit of the above mentioned type can be advantageously used in a telephone exchange in order to be able to identify a calling line. Such an identification will in general be required for ticketing purposes. The circuit wishing to obtain the identification of a calling line will cause the application of an A.C. energy source to a test conductor of the calling line by means of the switches and of their circuits which are already branched on the calling line. An A.C. potential will thus be brought by the test conductor to the line circuit of the calling line. The line circuit constitutes one of the input circuits of the identifier, and consequently the A.C. energy will cause the operation of a relay combination which will characterise the number of the calling line, and one will be able to transmit its identity to the circuit having requested the identification of the calling line. From then on, the identification circuit has finished its function and can be used again to determine the identity of another calling line.

When the identification circuit is essentially constituted by an impedance network, it possesses the advantage that the identfication is practically instantaneous and depends only upon the operating time of the relays included in the output circuits. Thus, it is seen that the time necessary to identify a calling line can be very short and of the order of a few hundreds of seconds. Consequently, the number of identification circuits for a telephone exchange can be extremely small since an identifier is used only during an extremely short time. To the time necessary to operate the combination of relays characterising the calling line, one must of course add the seizure time of the identification circuit and its release time, in order to be able to determine the required number of identification circuits in function of the telephone traffic. In any case, it is perfectly conceivable that only one identification circuit of the type mentioned above need be provided in a telephone exchange.

An identification circuit of the type discussed above substantially distinguishes itself from identification circuits used until now in telephone exchanges. Until now, the circuits used generally accomplish the identification function in a sequential manner. An electrical signal is applied to a test wire of the calling line which it is desired to identify, but the detection of this signal by the identification circuit (and which must cause the operation of relays or equivalent devices in order to characterise the calling line to which the signal is applied), is not directly made. Hunting takes place by means, for example, of telephone finders in order to determine to which line the signal has been applied.

For more details concerning these identification systems already applied, one will be able for instance to usefully refer to the U.S. Patent No. 2,338,242. Without entering into the details of such arrangements, it can be said that the hunting time which is necessary for the identification, before one can obtain the identity of a calling line, is essentially due to the necessity of avoiding parasitic couplings between the various lines and which can result in the application of part of the energy provided to the line which must be identified, to detecting devices which do not correspond to the detecting devices whose combination characterises the line to which the signal is applied.

A sound general view of the identification problem and in particular the identification in telephone exchanges, may be obtained by referring to the article of H. H. Schneckloth which appeared in the July, 1951 issue of "The Bell System Technical Journal" on page 588 and further, and entitled "Some basic concepts of translators and identifiers used in telephone switching system." In particular, this article briefly describes a system using an A.C. energy source to identify a calling line. It is to be remarked that the use of an A.C. energy source provides the advantage that it can be applied by means of a condenser to test conductor which remains free for D.C. current signalling. If one refers particularly to Fig. 13(*a*) of the above mentioned article, it will be seen that each sleeve conductor of the line is permanently connected to ground by means of a condenser in series with a resistance. The junction point of the condenser and of the resistance, and which is not connected to ground, is connected by means of four resistances individual to each line to detecting devices of which there exist four groups of ten. The first resistance of each line is connected to one of the detecting devices of the first group, the second resistance is connected to one of the detecting devices of the second group, and so on. In this manner, when an A.C. current is sent in the sleeve conductor of the calling line to be identified, a portion of this current will reach four detecting devices which will operate and the combination of which will characterise the calling line number on a four-digit decimal basis. The condenser connected to each sleeve conductor prevent any D.C. coupling between various sleeve conductors belonging to different lines. Such couplings must be avoided in order that the D.C. signals circulating on a sleeve conductor should not reach other sleeve conductors. The ground connected resistance limits the back-up effects which have until now been unavoidably associated with identification circuits of this type. The back-up coupling can be defined by the following explanation:

Assuming that various lines are connected to a same detecting device by means of one of their four resistances, the signal portion reaching a detecting device corresponding to the line to be identified will also be transmitted to these other lines. From there on, a portion of this energy will be applied to detectors which do not correspond to the four detectors to which the line to be identified is directly connected by means of these four resistances.

The identification system briefly described above and of which the essential element is an impedance network to perform the coding of the identity of a calling line towards a limited number of detectors, is described in more detail in the U.S. Patent No. 2,672,515. In order to reduce the back-up couplings to a value such that the discrimination between signals which must activate detectors and those which must not activate them, can be easily performed, a very low value for the resistance individual to each line which is connected to ground is favoured. On the other hand, the series resistances going towards the detectors will be substantially high. The respective values mentioned are 100 and 10,000 ohms. Although this system effectively permits a good discrimination between the effective signals and the parasitic signals, this is nevertheless obtained at the expense of a considerable energy loss for the effective signals with respect to the available source energy. Indeed, when there is a large number of lines to be identified, such as 10,000, an appreciable number of series resistances are effectively placed in parallel towards ground in so far as the signal transmission towards the detectors which must be activated is concerned. For a 10,000 line system wherein the ratio between the series resistance and the resistance towards ground is 100, one will obtain a discrimination of the order of 40 decibels between the effective signals and the parasitic signals, but this will unavoidably entail a loss of the order of 60 decibels between the energy available from the source and the said effective signals. It results therefrom that each detector must be provided with means for considerably amplifying the received signal, in order that the reception of this signal shall ultimately cause the operation of a telephone-type relay. As shown in the patent, three amplifier tubes are necessary in order to amplify the signal received by each detector, and in addition to the associated circuits, one must still provide filters and an integrating device, in addition to the rectifying device which will provide a D.C. voltage capable of operating the relay. Additional electrical networks will also be required in order to check the accuracy of the received code. Indeed, due to the considerable transmission loss, the signals which reach the inputs of the detectors are at a very low level, and consequently are subject to be influenced by any spurious signals. This low level also appears as being the reason motivating the use of filters and integrating devices which will insure a certain degree of immunity from spurious signals. The verification of the received code will consist in ensuring that the number of received signals for each group of detectors is constant. In fact, the coding network permits to identify on the basis of four groups of five detectors, a combination of two detectors out of five being operated within each group. In order to avoid the use of eight series resistances per line permitting a coupling towards each of the eight detectors corresponding to the line, the coupling is performed in two stages. A first stage connects each line to two intermediate points of which each is taken within a group of 100 points. In turn, each of the intermediate points is connected by means of four series resistances to four detectors, two out of a first group of five and two out of a second group of five, the two first groups of five detectors corresponding to the first group of 100 intermediate points and the two last groups of five detectors corresponding to the second group of 100 intermediate points.

On the whole, it is seen that the loss of useful energy is responsible for making the detecting circuit rather complicated.

As object of the invention is to provide an identifier of the coding network type comprising passive elements, and arranged in such a way that there is no strict relationship between the transmission of the energy towards the detecting circuits which must be activated to characterise a line to which this energy is applied; and the difference in level between the signals applied to the detectors which must be activated and those applied to the detectors which must not be activated.

Another object of the invention consists in providing an identifier of the above type using a source of A.C. signals as energy source to be applied to a circuit to be identified, and realized in such a way that the effective coupling between the detectors which must be activated and those which must not be activated is substantially nil.

Another object of the invention consists in providing an identifier of the above type and for which the A.C. source provides substantially a maximum of energy, this by impedance matching, the whole of this available energy being substantially divided among the detectors to be activated.

In accordance with a characteristic of the invention, an electrical identifier including a plurality of input circuits, a plurality of output circuits, a coding network comprising a plurality of coupling impedances between each input circuit and a combination of output circuits characterising the input circuit, whereby an A.C. energy source may be applied to an input circuit causing thereby the delivery of energy to the output circuits forming the said combination corresponding to the activated input circuit, is characterised by additional coupling impedances provided in order that the equivalent transfer impedance between any pair of output circuits of which one is part of a combination of output circuits characterising an input circuit to which energy is applied, and of which the other is not part of the said combination, is substantially infinite at the frequency of the A.C. energy source, whereby an arrangement without back-up is obtained, no energy reaching those output circuits which are not part of the combination of output circuits characterising the input circuit to which A.C. energy is applied.

In accordance with another characteristic of the invention, an electrical identifier as defined above, is characterised by the fact that the said coupling impedances and the said additional coupling impedances are purely reactive, whereby it results that no energy is dissipated in the coupling networks and that the whole of the energy available from the A.C. source applied to an input circuit can be distributed among the corresponding combination of output circuits.

In accordance with yet another characteristic of the invention, an identifier such as defined above is characterised by the fact that the output circuits include rectifiers which serve not only to rectify the A.C. energy reaching an output circuit, but also to form a final coding network destined to reduce the number of detecting devices such as telephone relays, the rectifiers also permitting an effective decoupling between any pair of detecting devices comprising an activated detecting device and another.

The objects and characteristics of the invention mentioned above as well as others, will become more apparent by referirng to the following detailed description to be read in conjunction with the accompanying drawings and where:

Fig. 1 schematically represents a first embodiment of the invention;

Figure 5:
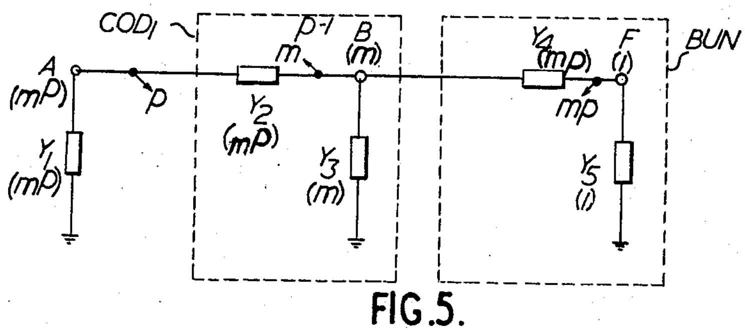
Figure 6:
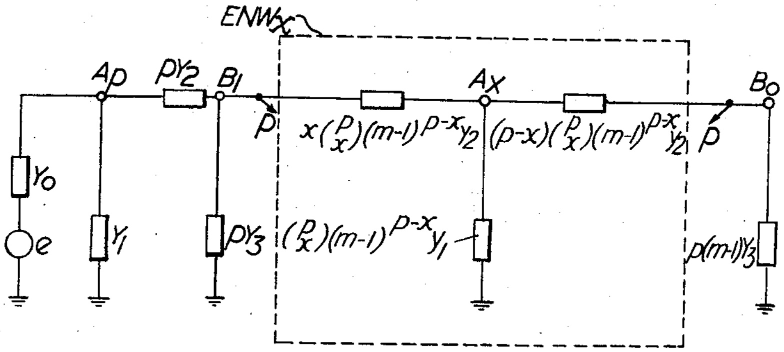
Figure 7:
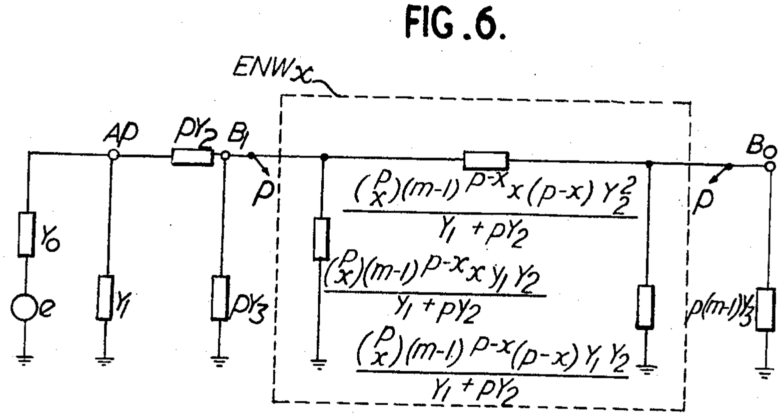
Figure 8:
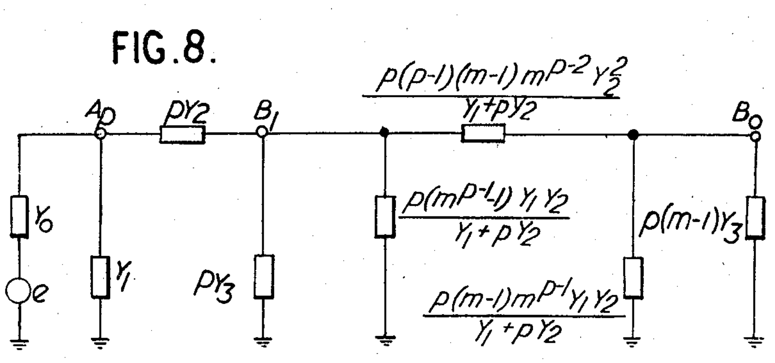
Figure 9:
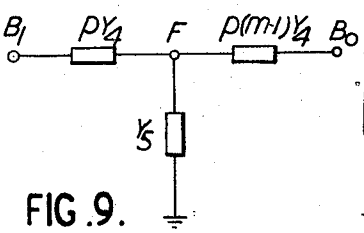
Figure 10:
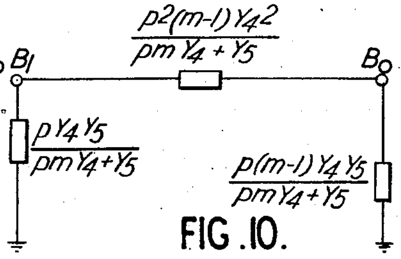
Figure 11:
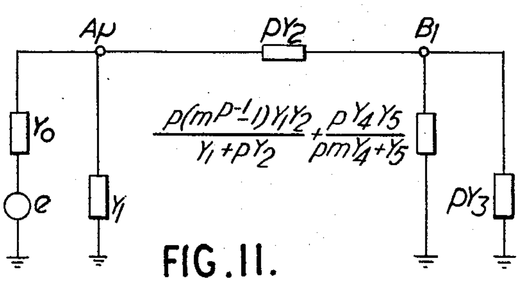

Fig. 5 schematically represents a second embodiment of the invention;

Fig. 6 represents the circuit equivalent to that of Fig. 5 when an A.C. energy source is applied to one of the input circuits, but solely in so far as the coding network connecting the input circuits to the output circuits is concerned;

Fig. 7 represents a new circuit substantially equivalent to the circuit of Fig. 6;

Fig. 8 represents yet another circuit substantially equivalent to those of Figs. 6 and 7;

Fig. 9 represents a network equivalent to that of Fig. 5 when an A.C. energy source is applied to one of the input circuits, but corresponding solely to the additional coupling impedances constituting the back-up neutralising network;

Fig. 10 represents a circuit rigorously substantially similar to that of Fig. 9;

Fig. 11 represents the equivalent circuit corresponding to the whole of the network of Fig. 5 and obtained by the superposition of the equivalent circuits of Figs. 8 and 10, and when the elements of the networks are chosen so that the whole of the energy provided from the source is divided solely between the output circuits forming the combination corresponding to the input circuit which is activated;

Fig. 12 schematically represents a third embodiment of the invention;

Fig. 13 represents the equivalent circuit of the network of Fig. 12 when an A.C. energy source is applied to one of the input circuits, but solely in so far as the coding network connecting the input circuits to the output circuits is concerned;

Fig. 14 represents the equivalent circuit of the network of Fig. 12 when an A.C. energy source is applied to one of the input circuits, but solely in so far as the back-up neutralising network is concerned;

Fig. 15 represents the equivalent circuit for the whole of the network of Fig. 12 and corresponding to the superposition of the equivalent networks of Figs. 13 and 14, when the whole of the energy applied to one of the input circuits is entirely divided between the output circuit whose combination characterises the activated input circuit.

Figure 16:
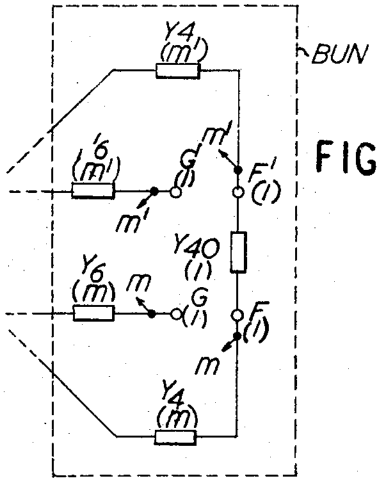
Figure 17:
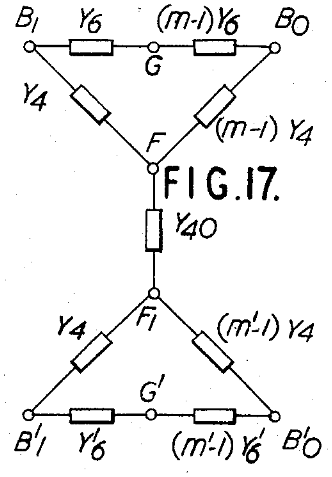
Figure 26:
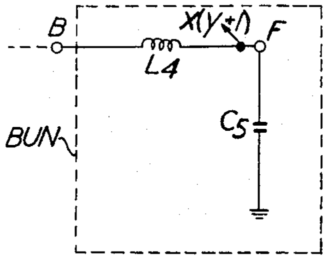
Figure 27:
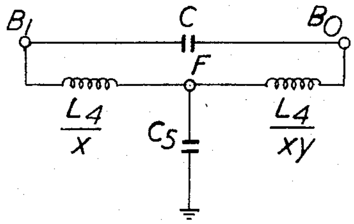
Figure 28:
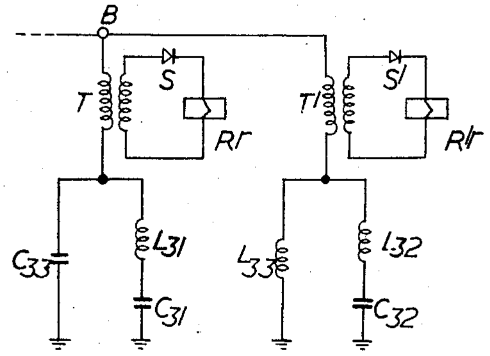
Figure 18:
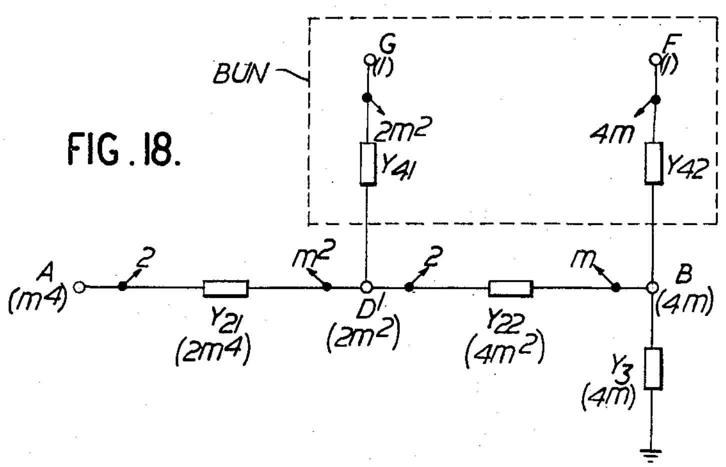
Figure 19:
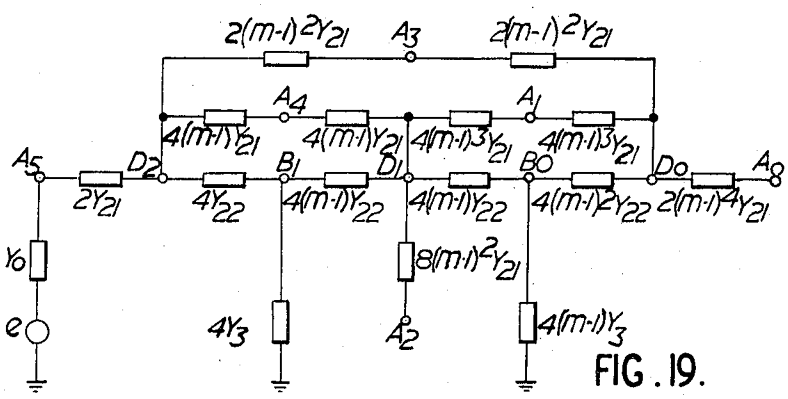
Figure 20:
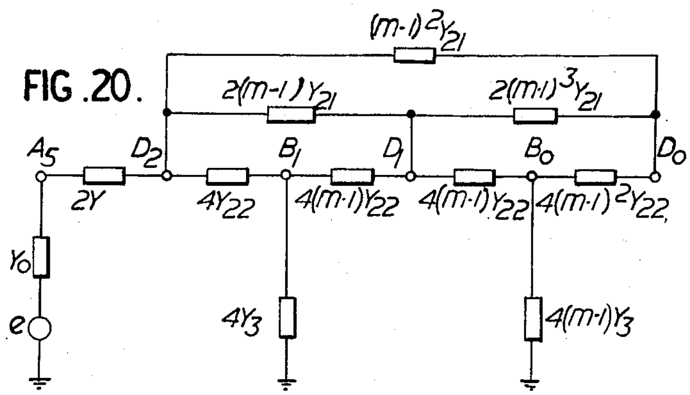
Figure 21:
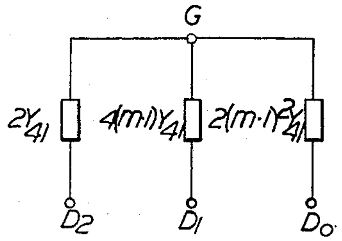
Figure 22:
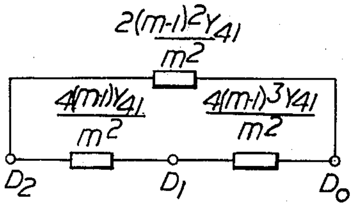
Figure 23:
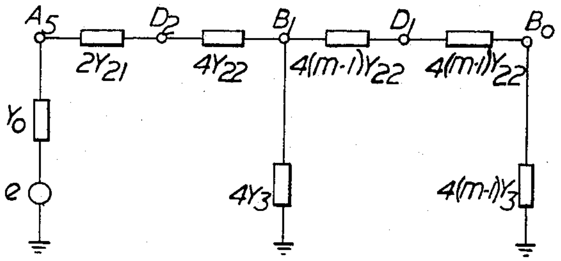
Figure 24:
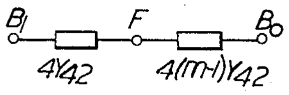
Figure 25:
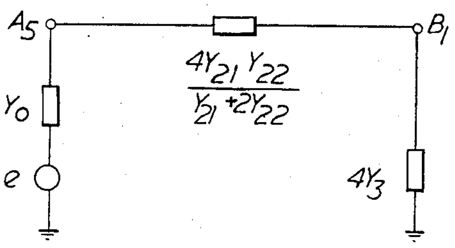
Figure 29:
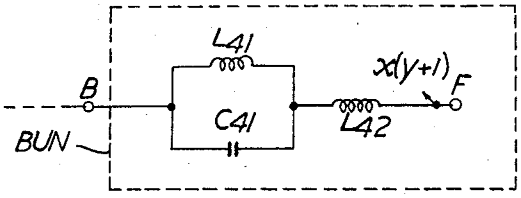
Figure 30:
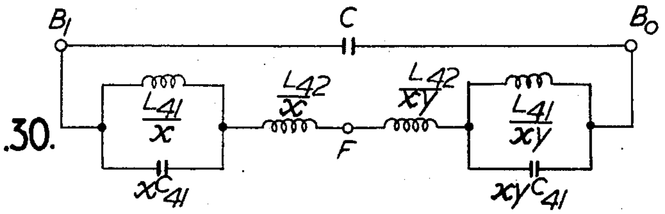
Figure 31:
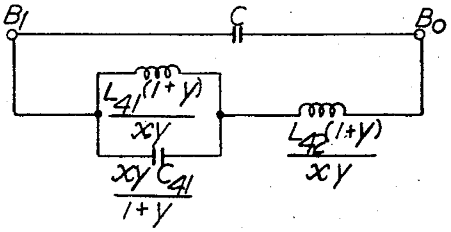
Figure 32:
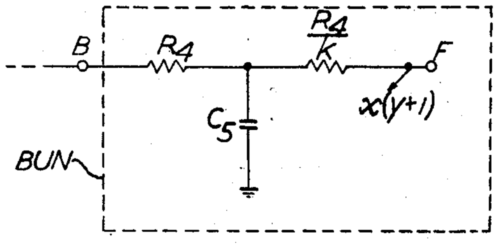
Figure 33:
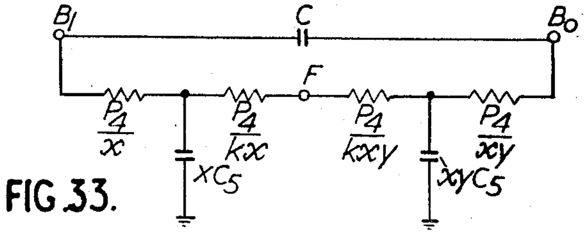

Fig. 16 represents a modification of the back-up neutralising network shown in Fig. 12;

Fig. 17 represents the equivalent circuit of the neutralising network of Fig. 16 when an A.C. energy source is applied to one of the input circuits;

Fig. 18 schematically represents a fourth embodiment of the invention wherein the coding network between the input and output circuits comprises two cascaded coupling stages;

Fig. 19 represents an equivalent circuit of the network of Fig. 18 when an energy source is applied to one of the input circuits, but solely in so far as the coding network between the input and the output circuits is concerned;

Fig. 20 represents a circuit substantially equivalent of that of Fig. 19;

Fig. 21 represents the equivalent circuit of the network of Fig. 18 when an energy source is applied to one of the input circuits, but solely in so far as a first part of the back-up neutralising network is concerned;

Fig. 22 represents a circuit substantially equivalent to that of Fig. 21;

Fig. 23 represents the superposition of the equivalent circuits of Figs. 20 and 22 when a certain relation between the elements is satisfied;

Fig. 24 represents the equivalent circuit of the network of Fig. 18 when an energy source is applied to one of the input circuits, but solely in so far as a second part of the back-up neutralising network is concerned;

Fig. 25 represents the superposition of the equivalent circuits of Figs. 23 and 24 when an additional relation between the elements is satisfied, and such that the whole of the energy applied to one of the input circuits is divided between the output circuits whose combination characterises the activated input circuit;

Fig. 26 schematically represents an embodiment of a back-up neutralising network and whose elements are purely reactive;

Fig. 27 represents the equivalent circuit of the network of Fig. 26 when the latter is activated;

Fig. 28 schematically represents a detailed embodiment of two output circuits when two A.C. energy sources may be applied to the input circuits, the frequencies of these two sources being distinct;

Fig. 29 represents a back-up neutralising network corresponding to that of Fig. 26, but adapted to be effective at two distinct frequencies;

Fig. 30 represents the equivalent circuit of the network of Fig. 29 when the latter is activated;

Fig. 31 represents a circuit substantially equivalent to that of Fig. 30;

Fig. 32 represents a back-up neutralising network solely comprising resistors and condensers;

Fig. 33 represents the equivalent circuit of the network of Fig. 32 when the latter is activated.

Before referring to the various figures starting with Fig. 1, it will be useful to remark that all the embodiments which will be described will show unbalanced circuits, i.e. all incorporating a ground return circuit. This arrangement is, of course, not essential and the various unbalanced network embodiments may all be realized by means of balanced networks, i.e. with respect to ground.

It should also be noted that the term admittance will generally be used in the remaining part of the description, this definition of the elements being more appropriate to the types of analysis required.

Figure 1:
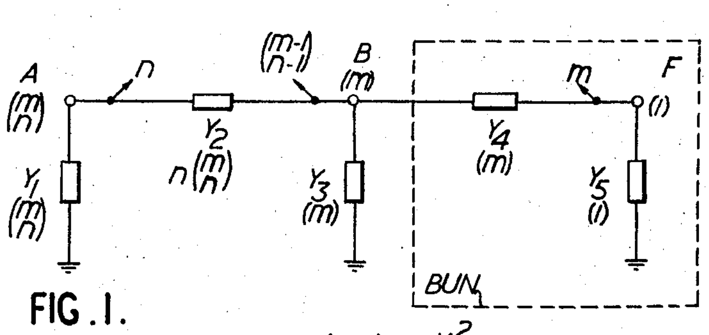

By referring to Fig. 1, the latter represents an identification circuit permitting the identification of one point among a plurality of $$\binom{m}{n}$$

points by means of $m$ detecting devices. The expression $$\binom{m}{n}$$

represents the binomical coefficient and is expressed by $$\binom{m}{n}=\frac{m!}{n!(m-n)!}=\frac{m(m-1)\ldots\ldots(m-n+1)}{n(n-1)\ldots\ldots\ldots\ldots(1)} \quad (1)$$

Purely by way of example, by means of five detecting devices one will be able to identify 10 different points by operating on the basis of a 2 out of 5 code, which is well known in view of the correspondence of the number of possible combinations with the decimal radix. Among the $$\binom{m}{n}$$

points A of which any may be identified by the application of an input signal to this particular point, one only has been represented. The denomination $$\binom{m}{n}$$

has however been marked below A in order to characterise the number of these points. This practice will be repeated for the various figures accompanying the description and all the multiple points as well as the multiple elements will be followed by an indication as to their number in the complete network. From Fig. 1 it is seen that each A point is connected to $n$ points B, each time with the help of a dipole having an admittance $Y_2$. As for the A points, only a single B point has been represented, but there exist $m$ for all of the network. The fact that each A point is connected to a combination of $n$ points B particular to this point, is indicated by the multipling arrow marked with $n$. For the whole of the network there will thus be $$n\binom{m}{n}$$

admittances $Y_2$. In this way, it will be realized that each B point is connected to $$\frac{n}{m}\binom{m}{n}=\binom{m-1}{n-1}$$

points A. The admittance of each of these A points with respect to ground has been indicated by $Y_1$, while the admittance of each of the B points with respect to ground has been represented by $Y_3$.

In addition to what has just been said, Fig. 1 shows a back-up neutralising network BUN which is connected to the various B points. Before considering the effect of this BUN network, the network of Fig. 1 will first of all be studied without this BUN network.

The equivalent admittance between any B point and ground will first of all be considered. As the multipling arrow near the B point indicates, each of the latter is connected to $$\binom{m-1}{n-1}$$

points A. Each of these $$\binom{m-1}{n-1}$$

networks which connect the B point considered to this plurality of A points, is essentially a star network, each A point being connected to ground by the admittance $Y_1$ and to $n$ points B each time through an admittance $Y_2$. It is generally known that a three-branch star network can be transformed into a triangle network by elimination of the star point, the triangle network being in all respects equivalent to the star network. On the other hand, in the "Journal of the Institution of Electrical Engineers" of 1924, volume 62, page 916, this equivalence property has geen generalised for the case of a transformation of a star network having one star point and any number of branches. The admittance between any pair of points, when the star point has been eliminated, is equal to the product of the admittances which connected each of the points forming the pair to the star point which one desired to eliminate, this product being divided by the sum of all the admittances connected to the star point.

Consequently, for each admittance star having an A point as centre, one will have an admittance between a point B part of the star considered and ground, which will be equal to $$\frac{Y_1Y_2}{Y_1+nY_2}$$

Figure 2:
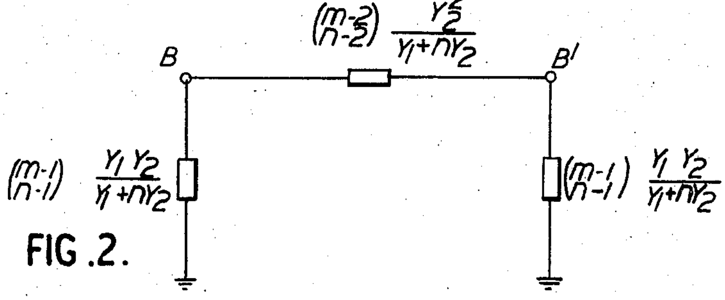
Fig. 2 represents a first equivalent circuit useful to explain the circuit of Fig. 1.

For the whole of the network, the equivalent admittance between a point B and ground, after elimination of all the A points, will thus be that represented in Fig. 2 where two arbitrary B points respectively indicated by B and B' have been represented. On the other hand, still using the theorem of equivalence between an arbitrary star network with a single centre and a corresponding polygon network, the equivalent admittance between two points such as B and B', by considering a single star network having an A point as centre, is equal to $$\frac{Y^2_2}{Y_1+nY_2}$$

If a particular pair of B points such as B and B' indicated in Fig. 2 is considered, this pair of B points will be found in $$\binom{m-2}{n-2}$$

star networks issued from a corresponding number of A points. Therefrom, it results that the equivalent admittance between any pair of B points is that represented in Fig. 2.

As there exists an equivalent admittance between any pair of B points, any application of energy to a particular A point for the purpose of collecting energy at the $n$ point B corresponding to the A point considered, will have the result of also applying a certain energy to the remaining $(m-n)$ points B.

The quantity of parasitic energy appearing at the $(m-n)$ points B which do not characterise the A point which one wishes to identify will depend on the equivalent admittance joining each pair of B points.

The BUN network shown in Fig. 1 will permit the reduction of the admittance between any pair of B points to zero. Indeed, in accordance with Fig. 1, each of the $m$ points B is connected with the help of the BUN network to a unique point F, each point by means of a dipole whose admittance is indicated by $Y_4$. Thus, there are $m$ admittances $Y_4$ for the whole of the network considered. Further, the point F has an admittance with respect to the ground represented by $Y_5$. As will be seen later, this admittance $Y_5$ is not in fact essential, and this is also true for the admittances $Y_1$ connecting each A point to ground. Nevertheless, in many networks, such admittances will in fact be present, parasitic capacitances to ground for example.

The theorem of equivalence between a star network and the polygon network will again be used to determine the equivalent admittance between any B point and ground, and resulting from the BUN network. The equivalent admittance between any pair of B points and also resulting from the BUN network will be obtained in the same way.

Figure 3:
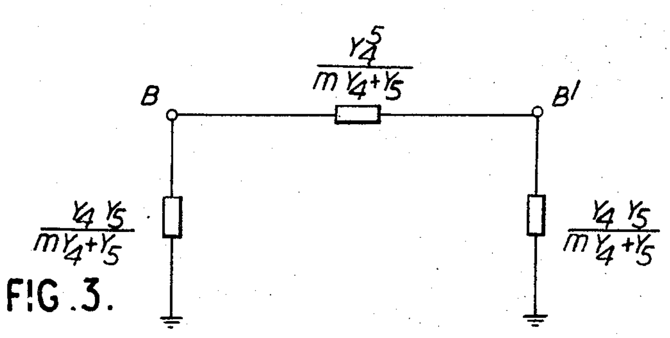
Fig. 3 represents a second equivalent circuit useful to explain the operation of the circuit of Fig. 1.

These equivalent admittances have been represented in Fig. 3. It will be noted that neither Fig. 2, nor Fig. 3 represent the admittance $Y_3$ which, of course, connects each B point to ground. The total equivalent admittance interconnecting any pair of B points is thus the sum of the corresponding admittances represented in Figs. 2 and 3. Consequently, if one satisfies the relation $$\binom{m-2}{n-2}\frac{Y_2^2}{Y_1+nY_2}+\frac{Y_4^2}{mY_4+Y_5}=0 \qquad (2)$$

the equivalent adittance between any pair of B points will thus be nil, and no fraction of the input energy applied to a particular A point shall reach the $(m-n)$ B points which are not directly connected by an admittance $Y_2$ to the A point considered.

If one considers the Relation 2 it is seen that at least one of the admittances such as $Y_4$ for example shall have to be of a sign contrary to that of the admittances $Y_1$ and $Y_2$. Consequently, if A.C. energy is applied to a particular A point for the purpose of identifying it, the admittances such as $Y_1$, $Y_2$, $Y_4$ and $Y_5$ can be realized by means of elements whose admittance is a function of frequency. In particular, the admittances $Y_1$ and $Y_2$ may each be simply constituted by a condenser, while on the other hand each of the admittances $Y_4$ and $Y_5$ will be constituted by an inductance. For such cases, it will be possible to satisfy the Relation 2 at a well determined frequency. This amounts to saying that the frequency of the energy source used to feed the A point having been determined, the elements of the network will be chosen in function of this frequency in order to satisfy the Relation 2.

The Relation 2 being satisfied, a very simple equivalent network can represent the complete circuit of Fig. 1, a source of A.C. voltage $e$ having an admittance $Y_0$ is applied to a particular A point which will be called $A_n$. Only the $n$ points B which are directly connected to this particular $A_n$ point must be taken into consideration since the remaining B points, after elimination of all the A points except $A_n$ by star-polygon transformations, are completely decoupled from the energy source. As one is forced to keep the $A_n$ point in the circuit since it is at this point that the A.C. voltage source is applied, the $n$ points B directly connected to this point will be connected by an equivalent admittance between each pair of B points and resulting from the elimination of the $$\left(\frac{m}{n}\right)-1$$

points A which will be equal to $$\frac{-Y_2^2}{Y_1+nY_2}$$

On the other hand, the equivalent admittance of each of these B points with respect to ground will be equal to the sum of the equivalent admittances represented in Figs. 2 and 3 and respectively resulting from the elimination of the A points and of the F point, minus an admittance equal to $$\frac{Y_1Y_2}{Y_1+nY_2}$$

the equivalent admittance corresponding to the $A_n$ point which has not been eliminated. As each of these B points is directly connected to the $A_n$ point by admittances having the same value, i.e. $Y_2$, and as on the other hand each of these B points is connected to ground by an admittance which has the same value for all these B points, the latter will all be at an equal potential. Therefrom, it results that the various residual admittances which interconnect them in pairs must not be taken into consideration.

Figure 4:
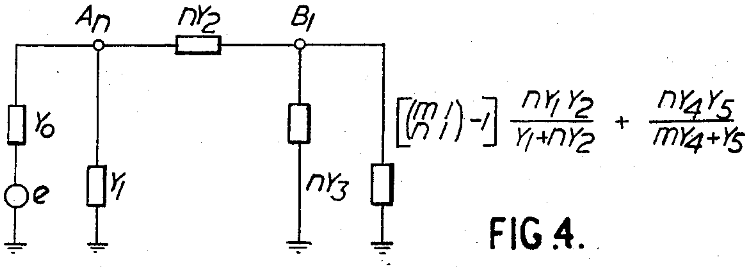
Fig. 4 represents the circuit equivalent to that of Fig. 1 when the A.C. energy applied to an input circuit is entirely divided between the output circuits whose combination characterises this input circuit.

Hence, the equivalent circuit of the arrangement shown in Fig. 1 in the case where a source *e* is applied to a particular $A_n$ point, can be represented by Fig. 4 where point $B_1$ is on the one hand connected to point $A_n$ through an admittance $nY_2$ and on the other hand to ground through an admittance $nY_3$. At point $B_1$, a potential will be established equal to that appearing at each of the *n* points B which are directly connected to point $A_n$. Further, point $B_1$ is still connected to ground through an equivalent admitttance indicated in Fig. 4 and whose value is explained by the preceding considerations. Point $A_n$ is of course also connected to ground through an admittance $Y_1$.

If the admittances $Y_1$, $Y_2$, $Y_4$ and $Y_5$ are all constituted by pure reactances, the source *e* of admittance $Y_0$ is connected to the whole of the *n* loads $Y_3$ by a purely reactive network. The latter will thus dissipate no energy except the residual losses of the reactive elements. These losses represent however a secondary effect and generally negligible, particularly in what concerns the condensers. Energy losses may also result from the absence of matching between the source admittance $Y_0$ and the input admittance of the network on the one hand, and between the combined load admittance $nY_3$ and the output admittance of the network on the other hand.

However, it is known that a purely reactive network may be used to match a resistive source to a resistive load without mismatch losses. In this respect one may for example usefully refer to the book of Everitt entitled "Communication Engineering" and more particularly to Chapter VII treating impedance transformations, pages 241, 246, 249 and 263–267.

Briefly, for a purely reactive $\pi$ network interconnecting a resistive source of conductance $G_A$ to a resistive load of conductance $G_B$ and comprising the admittances $jY_A$ and $jY_B$ respectively in shunt on $G_A$ and $G_B$, as well as the admittance $jY_C$ interconnecting the source to the load, the power in the load can be expressed by $$\frac{e^2G_A}{4+\left(\frac{\sqrt{G_AG_B}}{Y_c}+\frac{Y_AY_B+Y_AY_C+Y_BY_C}{Y_c\sqrt{G_AG_B}}\right)^2+\left(\left(1+\frac{Y_A}{Y_C}\right)\sqrt{\frac{G_B}{G_A}}-\left(1+\frac{Y_B}{Y_C}\right)\sqrt{\frac{G_A}{G_B}}\right)^2} \quad (3)$$

where *e* represents the E.M.F. of the source.

The denominator of this expression comprising the sum of three terms which are prefect squares, and the first term being constant, the cancelling of the two other terms corresponds to maximum energy being sent into the load, i.e.

$$\frac{e^2G_A}{4}$$

This corresponds to the reactive network matching the load to the source. The cancelling conditions are:

$$\frac{G_A}{G_B}=\frac{Y_A+Y_C}{Y_B+Y_C} \quad (4)$$

$$G_AG_B=-(Y_AY_B+Y_AY_C+Y_BY_C) \quad (5)$$

These two conditions imply that one of the reactances must necessarily be of a sign opposite to that of the other two at the frequency of the source, and that the coupling should be sufficient, i.e.

$$Y_C^2 \geqslant G_AG_B$$

For perfect matching, it may prove to be necessary add reactive elements of appropriate value and sign either between the source and ground, or between the A points and ground, or else between the B points and ground. Of course for the design of the matching conditions one will take into account the reactive components of the source admittance $Y_0$ as well as those of the load admittance $Y_3$. The load $Y_3$ comprises the admittance of the detecting device connected between each B point and ground.

In cases where it is desired to use reactances of the same sign, it is to be noted that Relation 5 may be kept with a change of sign. In this case, the Relation 6 will still cancel the third term of the denominator of 3, but the modified Relation 5 will produce a minimum value for the second term, i.e.

$$4\frac{G_AG_B}{Y_C^2}$$

The energy transmitted to the load will however always be lower than the maximum energy corresponding to perfect matching between the source and the load.

As no part of the input energy is applied to detecting devices which do not characterise the input point, the equivalent network associating the input point to the corresponding detecting points is purely reactive, and finally, a perfect impedance match between the source and the loads is possible so that, one can obtain maximum energy from the source. This maximum energy will be entirely dissipated among the *n* detecting devices which characterise the A point to which the A.C. energy source is applied. Consequently, the detecting devices can be very simple and need not require an individual amplification system for each B point such as for example an amplifying tube. A relay of the ordinary telephone type can be connected between ground and the corresponding B point by means of a rectifying system which may eventually be constituted by a rectifier in series with the winding of the relay. As mentioned above, in parallel or in series with this device one can branch any reactive dipole useful to ensure a proper impedance match in order to draw the maximum of energy from the source. The use of an individual transformer forming part of each load admittance $Y_3$ is not in principle essential but it may prove useful to increase the admittance of the rectifying system and the relay between each B point and ground. It may be useful that the equivalent admittance between each B point and ground should be high in order to ensure than any imperfection in the neutralisation of the couplings between B points should have the smallest possible effect. Indeed, if a certain non-zero admittance remains between the B points represented by $B_1$ in Fig. 4 and the other $(m-n)$ points B; this will correspond to a non-indicated admittance in Fig. 4 being derived between the $B_1$ point and ground. As this parasitic admittance will in any case be small, and if on the other hand the admittance between the B point and ground is high, the parasitic shunt will be substantially without effect. In principle, the value of the parasitic couplings is essentially determined by secondary effects such as the manufacturing tolerance that one may give to the various components intervening in the Relation 2, the resistive losses of the elements assumed to be purely reactive (essentially, the Q factor of the inductances) and the variations of certain elements such as $Y_1$ following parasitic capacitance variations.

Parasitic capacitance variations may happen for example when the identification system of Fig. 1 is applied to a telephone exchange. In this case, the A points will be constituted by a test conductor for each of the telephone lines to be identified. This test wire has an equivalent parasitic capacitance to ground the value of which depends on the length of the wire. Preferably, one will take care that this admittance $Y_1$ should be small with respect to $nY_2$. Then, as indicated by Relation 2 the differences between the equivalent parasitic capacitances towards ground for each of the test wires may be neglected.

For each test wire, the equivalent admittance $Y_1$ may also vary when the test wire is extended by means of finders or selector switches which will be branched on the line. In this case, the equivalent admittance $Y_1$ may substantially increase. It is in view of such variations that one may consider it useful to operate with a substantially high admittance between the B points and ground. One may also provide a condenser connecting each test wire (point A) to ground, the value of this condenser being chosen well above the maximum value of the parasitic capacitance which may appear between the test wire and ground. This entails however the use of an additional component per line to be identified, and the value of this condenser may be rather large. Hence, it seems more economical to keep to a choice of the value of the condenser forming the admittance $Y_2$ which will be sufficiently high so that the value $nY_2$ will always be substantially higher than the value $Y_1$; and also, to increase the admittance between each B point and ground, which may necessitate the use of a transformer if the admittance of the rectifying system and of the relay is too low.

In so far as obtaining adequate energy in the useful loads is concerned, when variations of $Y_1$ remain admitted, one will design the elements for appropriate extreme value of $Y_1$, and in order to obtain an output energy substantially equal in the two extreme cases.

Finally, a parasitic effect which may also have a certain importance is the parasitic coupling between two A points. Indeed, if, in a telephone system the A points are constituted by test wires producing a certain parasitic capacity towards ground depending on the length of the wires, these will generally be grouped, whereby a parasitic capacitance between A points is also to be considered. In practice, this mutual capacitance is however sufficiently low to be treated as a secondary effect. It will suffice to choose for the condenser forming $Y_2$ a reasonably high value with respect to the mutual parasitic capacitance, in such a way that $Y_1+nY_2$ will remain sufficiently high with respect to this mutual capacitance. The ratio between these last two values determines that between the potential applied to the activated A point and that reaching another A point by means of the mutual capacitance.

An identification network permitting identification of any among $$\binom{m}{n}$$

points by means of $m$ indicating devices having been described, we will now describe a similar identification network using a coding system also of a general scope but of a type different from the network shown in Fig. 1. In accordance with this coding system, well known in itself, $p$ groups of $m$ detecting devices are provided in order to be able to identify any among a plurality of $m^p$ points.

In accordance with this arrangement shown in Fig. 5, each of the $m^p$ points A will be connected to a point B in each of the $p$ groups of $m$ points B. The symbolic representation system adopted in Fig. 1 has been kept in Fig. 5, and a single A point connected to a single B point by means of an admittance $Y_2$ has been shown. As previously, each point A is connected to ground by an admittance $Y_1$ and each B point is connected to ground by an admittance $Y_3$, the latter essentially comprising the admittance of the detecting device. As indicated by the multipling arrow $p$, the $COD_1$ network essentially corresponds to a group of $m$ points B, the other $p-1$ groups being identical. As there are on the whole $pm^p$ admittances $Y_2$, and $pm$ points B, each point B is found connected to $$\frac{pm^p}{pm}=m^{p-1}$$

points A. This is indicated by the multipling arrow adjacent to the B point shown.

The back-up neutralising network is again indicated by BUN and as in Fig. 1, it connects each of the $pm$ points B to a unique point F which it itself connected to ground through an admittance $Y_5$.

Although one may analyse the circuit shown in Fig. 5 in accordance with the method used for the circuit shown in Fig. 1, the reasoning becomes somewhat more complicated and it will be preferred to analyse the circuit of Fig. 5 in accordance with another method. The latter will necessitate somewhat longer explanations particularly for the general case envisaged, but it introduces complications which are only of an algebraic kind, and it permits easier establishment of an equivalent circuit.

Considering the circuit of Fig. 5 in accordance with this last method, the symmetry of the circuit enables that the $pm$ points B to be divided into two classes, a first class of $p$ points B which will be directly connected to the point $A_p$ to which the source shall be applied, and a second class of $p(m-1)$ points B which are not directly connected to this point $A_p$. The B points of the first class will all be at the same potential yet to be determined. Likewise, the B points of the second class will also be at an identical potential yet to be determined and different from the first common potential.

The existence of two classes of B points having been noticed, a similar division into classes of points will be made for the $m^p$ points A. The latter will be divided into $p+1$ classes. A first class of A points will comprise a single point, the $A_p$ activated point which is connected to the $p$ points B of the first class. A second class of A points will comprise all those which are connected to $p-1$ points B of the first class, as well as to a point B of the second class. The number of these A points pertaining to the second class is equal to $p(m-1)$. In a general manner, for the class of A points connected to $x(p\geqslant x\geqslant 0)$ points B pertaining to the first class; and consequently to $p-x$ points B pertaining to the second class, their number may be expressed by:

$$\binom{p}{x}(m-1)^{p-x} \tag{7}$$

In the same way as for the B points, the A points of a same class will be at a same potential and consequently a circuit equivalent to that of Fig. 5, when an energy source is applied to one of the A points, can be established by taking into account only $p+1$ points A and two points B.

This equivalent circuit is represented in Fig. 6. The point $B_1$ corresponds to the potential of the $p$ points B of the first class while the point $B_0$ corresponds to the potential of the $p(m-1)$ points B of the second class. Hence, the $B_1$ and $B_0$ points will be respectively connected to ground through admittances equal to $pY_3$ and $p(m-1)Y_3$. On the other hand the $B_1$ point will be connected to the $A_p$ point to which the source $e$ of the admittance $Y_0$ has been connected, by means of an admittance $pY_2$. The point $A_x$ corresponds to the common potential of all $$\binom{p}{x}(m-1)^{p-x}$$

points A forming the class of A points connected to $x$ points $B_1$. Consequently, it is on the other hand connected to $p-x$ points $B_0$, each time by means of an admittance $Y_2$. Therefrom, it results that the admittances indicated in Fig. 6 as respectively connecting the points $A_x$ and $B_1$ on the one hand, and $A_x$ and $B_0$ on the other hand, have the indicated value. Further, all the A points of the $x$ class are connected to ground, each through an admittance $Y_1$, and the total admittance indicated between point $A_x$ and ground is thus that represented in Fig. 6.

For each class of A points there exists therefore a T network between the points $B_1$, $B_0$ and ground. This equivalent network has been indicated by $ENW_x$ for the A points of the $x$ class, and the multipling arrows marked by $p$ and next to the points $B_1$ and $B_0$ thus indicate that on the whole there are $p$ networks of this type each time interconnecting the points $B_1$, $B_0$ and ground. There exists of course a $(p+1)^{th}$ network formed by the single A point of the $p$ class and solely connected between $B_1$ and ground, but this network is already indicated separately on the left of the figure since the source $e$ is applied to this point $A_p$.

It is therefore seen by considering the symmetry of the network of Fig. 5 and by subdividing the various points into classes of points having the same potential, that an equivalent network corresponding to the application of the source to a particular point can be immediately established. It is to be noted that the network of Fig. 6 does not include the elements due to the BUN circuit. These elements will be shown separately in order not to complicate the figure. The BUN network does not however affect in any way the symmetry of the circuit since each of the B points is connected to a single point by means of an identical admittance $Y_4$.

The equivalent circuit of Fig. 6 will be simplified in the following way. Each $A_x$ point can be eliminated by a star-mesh transformation such as shown in Fig. 7 which is a network which is wholly equivalent to that of Fig. 6 and from which all the A points except the driving point $A_p$ have disappeared.

Considering the equivalent network of Fig. 7, it is seen that the equivalent admittance interconnecting the $B_1$ and $B_0$ points is equal to $$\frac{Y_2^2}{Y_1+pY_2}\sum_{x=0}^{x=p-1} x(p-x)\binom{p}{x}(m-1)^{p-x} \quad (8)$$

Likewise, the equivalent admittances of the $B_1$ and $B_0$ points towards ground will be respectively given by $$\frac{Y_1Y_2}{Y_1+pY_2}\sum_{x=0}^{x=p-1} x\binom{p}{x}(m-1)^{p-x} \quad (9)$$

$$\frac{Y_1Y_2}{Y_1+pY_2}\sum_{x=0}^{x=p-1} (p-x)\binom{p}{x}(m-1)^{p-x} \quad (10)$$

The expressions which precede are however in a somewhat complex form, but they will be appreciably simplified by evaluating the various summations, i.e. by eliminating the variable $x$. These summations may be eliminated by using the binomial theorem and can be expressed by $$m^p=\sum_{x=0}^{x=p}\binom{p}{x}(m-1)^{p-x} \quad (11)$$

By differentiating (11) with respect to $m$, one obtains:

$$p(m-1)m^{p-1}=\sum_{x=0}^{x=p}(p-x)\binom{p}{x}(m-1)^{p-x} \quad (12)$$

This immediately gives the value of the summation appearing in the Expression 10 which corresponds identically to the summation obtained in the Identity 12.

By linearly combining the two Identities 11 and 12, the first being multiplied by $p$ and the second by $-1$, one obtains $$pm^{p-1}=\sum_{x=0}^{x=p}x\binom{p}{x}(m-1)^{p-x} \quad (13)$$

and which gives the value of the summation appearing in the Expression 9, with this distinction that the summation of the Identity 13 is higher by $p$ than that of Expression 9 since the first named summation comprises the value $x=p$ while the second stops at the value $x=p-1$.

The value of the summation appearing in the Expression 8 remains to be obtained. A second different summation of the Identity 12 with respect to $m$ will give:

$$p(m-1)(mp-p+1)m^{p-2}\sum_{x=0}^{x=p}(p-x)^2\binom{p}{x}(m-1)^{p-x} \quad (14)$$

A linear combination of the Identities 11, 13, and 14 based on the identity:

$$x(p-x)=p^2-px-(p-x)^2 \quad (15)$$

will finally give:

$$p(p-1)(m-1)m^{p-2}=\sum_{x=0}^{x=p}x(p-x)(m-1)^{p-x} \quad (16)$$

corresponding to the summation of (8).

Thus the Expressions 8, 9 and 10 respectively become:

$$p(p-1)(m-1)m^{p-2}\frac{Y_2^2}{Y_1+pY_2} \quad (17)$$

$$p(m^{p-1}-1)\frac{Y_1Y_2}{Y_1+pY_2} \quad (18)$$

$$p(m-1)m^{p-1}\frac{Y_1Y_2}{Y_1+pY_2} \quad (19)$$

Consequently, the equivalent circuit of Fig. 7 can in its turn be replaced by the substantially equivalent circuit of Fig. 8.

The equivalent circuit of the BUN network is represented in Fig. 9. It comprises only three star connected admittances and the F point can be eliminated in the usual manner to produce the equivalent circuit of Fig. 10.

The complete equivalent circuit of the network of Fig. 5 will thus be represented by the superposition of the circuits of Figs. 8 and 10. In so far as the equivalent admittance between the points $B_1$ and $B_0$ is concerned, the latter can be made equal to zero by satisfying the relation:

$$\frac{(p-1)m_p^{-2}Y_2^2}{Y_1+pY_2}+\frac{pY_4^2}{pmY_4+Y_5}=0 \quad (20)$$

Then, the $B_0$ point is completely decoupled from the $B_1$ point and may disappear from the equivalent circuit. When the Relation 20 is satisfied, the final equivalent circuit is that represented in Fig. 11. This final equivalent circuit corresponds to the final equivalent network which had been obtained in Fig. 4 for the network of Fig. 1, and the considerations previously given in relation to the final equivalent circuit of Fig. 4 are also applicable to that of Fig. 11.

Referring to the equivalent circuit of Fig. 8 which is that of the circuit of Fig. 5, with the exception of the back-up neutralising network BUN, this circuit gives a very precise idea as to the considerations given at the beginning of the description with respect to a system of the type described in the U.S. Patent No. 2,672,515. It has been said that the conditions giving a limited back-up were in opposition with those permitting a good transmission of the useful signal. By considering Fig. 8, the spurious back-up transmission can be expressed by the ratio between the admittance interconnecting $B_1$ and $B_0$ to the sum of this admittance and of the admittance between $B_0$ and ground. If one assumes that the admittance $Y_3$ is very low, which is logical since the input of each detector, in view of the small transmission of the useful energy will be general drive the grid of an amplifying tube, the inverse ratio expressing the loss may be written:

$$1+\frac{mY_1}{(p-1)Y_2} \tag{21}$$

On the other hand, the useful transmission can be expressed by the ratio between the admittance interconnecting $A_p$ to $B_1$ and the sum of this admittance to that interconnecting $B_1$ to ground, if one neglects the admittance interconnecting $B_1$ and $B_0$ for the calculation of the useful transmission. Therefore, for the inverse ratio expressing the loss one obtains:

$$1+\frac{m^{p-1}-1}{1+\frac{pY_2}{Y_1}} \tag{22}$$

The value of the Expression 22 giving the voltage transmission losses towards the detectors which must be operated, to make it as small as possible, it is of interest to choose $Y_2$ much larger than $Y_1$. However, as the value of the Expression 21 which represents this spurious transmission loss must be as large as possible, this indicates $Y_1$ must be much larger than $Y_2$. Thus it is clear that the two conditions are diametrically opposed. The solution proposed in the U.S. Patent No. 2,672,515 consists in choosing a ratio between $Y_1$ and $Y_2$ which is of the order of 100 which, for $m=10$ and $p=4$ (10,000 line exchange) gives a value of 334 to the Expression 21. With respect to the useful signal, the parasitic signal brought to the detectors which must not be activated thus suffers a loss of about 50 decibels. But on the other hand, the same ratio between $Y_1$ and $Y_2$ with the same numerical values of $m$ and $p$ gives to the Expression 22 a value of 954. This means that with respect to the input signal, the useful signal which must operate the particular combination of detectors will be subjected to a loss of nearly 60 decibels. This clearly expresses the necessity to use in that case complex detectors each comprising an appreciable number of tubes and associated circuits. Indeed, the very small available energy must be considerably amplified in order to permit the final operation of a relay terminating the detector. On the other hand, the fact that the useful signal at the input of a detector is at a very low level precaution to obtain a sufficient immunity with respect to spurious signals.

It will be remarked that the coding system of Fig. 5 has the advantage that it is readily adaptable to decimal numbering. Indeed, if one desires to use the system shown in Fig. 5 to identify telephone lines of a 10,000 line exchange, this will correspond to $m=10$ and $p=4$, and one will have four series of 10 detecting devices permitting the identification of the number of a line by its four conventional decimal digits for the thousands, the hundreds, the tens and the units. If one used the coding system of Fig. 1 for a 10,000 line exchange, the detecting devices would number 16 only, but the combination of 8 relays which would be operated to characterise the line to be identified would have no relation to the decimal system. Of course, although the two coding systems respectively represented in Figs. 1 and 5 have a general scope, they are not the only ones which can be used and they are solely given as representative examples. For instance, one could combine the principle of the operation of a constant number of detectors in a group (Fig. 1) with that of the use of several distinct groups. In other words, the arrangement could be analogous to that of Fig. 5, but in each group of $m$ detectors one would operate not one but a predetermined number greater than one. To fix ideas, in a case of a 10,000 line exchange, one could for example couple each of the 10,000 lines to be identified to detecting devices, each time with the help of 8 elements, 2 elements going towards 2 detectors in a first group of 5, 2 other elements going towards another combination of 2 detectors out of a second group of 5, and so on, which would indeed produce $$\binom{5}{2}^4=10,000$$

possible combinations of 8 activated detectors out of the 20 detectors used for the system. A system of this type could be provided with a back-up neutralising circuit such as shown in the Fig. 5 and the circuit analysis could be made in the manner indicated for the circuit of Fig. 5.

It will have been observed that this last coding system as well as those of Fig. 1 and of Fig. 5, are essentially symmetrical, each group of detectors possessing the same number of detectors, and in each group a combination of a number of detectors is operated which number is the same for each of the groups, and the same of course for each of the combinations characterising a particular line. This is not essential to permit the application of a back-up neutralising network. One may well consider two or several groups which do not comprise the same number of detectors. By way of example, the design of a neutralising network in the case of non-identical groups will be studied.

Fig. 12 represents an arrangement of this type using a first group of $m$ detectors and a second group of $m'$ detectors, $m'$ being not essentially equal to $m$. Each of the input A points to be identified is on the one hand connected to a B point out of the group of $m$ points B, and on the other hand to a point B′ out of the group of $m'$ points B′. Hence, the system will permit the identification of an A point among $mm'$ points A. In order to simplify the description, it will be assumed that the admittance of each A point with respect to ground can be considered as nil. As shown by Fig. 12, the A point represented is connected to the B point shown, by the admittance $Y_2$ and to the B′ point shown, by an admittance of the same value. As indicated by the multipling arrows adjacent to the points B and B′, each of those is respectively connected to $m'$ and $m$ points A.

As previously, each of the points B and B′ is connected in the BUN neutralising network to a single point F, each time by means of an admittance of value $Y_4$. Again to simplify the description, it will be assumed that the admittance of the point F with respect to ground can be considered as nil. Further, in view of the asymmetry between the groups of B points, the BUN neutralising network comprises two other single points G and G′. The point G is connected to each of the $m$ points B by an individual admittance $Y_6$ while the point G′ is connected to each of the points B′ by means of an individual admittance $Y'_6$. The admittance which could connect each of the points G and G′ to ground will not be taken into consideration, again with regard to simplification.

Considering first of all the circuit of Fig. 12 with the exception of the BUN network, its equivalent circuit may be established exactly in the same way as the equivalent circuit of Fig. 6 was established with respect to the circuit of Fig. 5. For the circuit of Fig. 12, it will however be necessary to consider four classes of points B and B′, the points of the same class having the same potential. Thus, there will be a point B forming a first class, which is that directly connected to the point $A_{11}$ to which the identification signal is applied. Likewise, there will be a single point B′ forming a second class and which is that directly connected to the point $A_{11}$. The third and fourth classes of B points will respectively comprise the $(m-1)$ points B which are not directly connected to the point $A_{11}$ and the $(m'-1)$ points B′ which are also not directly connected to the point $A_{11}$. If one calls $B_1$, $B'_1$, $B_0$ and $B'_0$ the points of the equivalent network respectively corresponding to the four classes of B points, the equivalent network appears as shown in Fig. 13. The point $A_{10}$ has a potential corresponding with that of the $m'-1$ points A which are on the one hand connected to the point $B_1$ and on the other hand to the point $B'_0$. Likewise, the point $A_{01}$ has a potential corresponding to that of $(m-1)$ points A connected on the one hand to the point $B'_1$ and on the other hand to the point $B_0$. Finally, the point $A_{00}$ has a potential corresponding to that of the $(m-1)$ $(m'-1)$ points A which are on the one hand connected to a point $B_0$ and on the other hand to a point $B'_0$. Thus, the circuit of Fig. 13 shows that there exist undesirable couplings between the points $B_1$ and $B'_0$ on the one hand, and $B'_1$ and $B_0$ on the other hand. The BUN network will permit their elimination.

The equivalent circuit of the BUN network is shown in Fig. 14. It will not necessitate particular explanations, the admittance values indicated between the points $B_1$, $B_0$, $B'_1$, $B'_0$ and F, G and G' being readily deduced from the BUN network shown in Fig. 12.

The complete equivalent network for Fig. 12 is thus obtained by superposing the network of Fig. 14 to that of Fig. 13. By considering this complete network, it is clear that the points $A_{10}$, $A_{01}$, $A_{00}$ on the one hand, and the points F, G and G' on the other hand, are not of interest insofar as the determination of the conditions permitting the neutralisation of the back-up couplings is concerned. The points $A_{10}$, $A_{01}$, $A_{00}$ are eliminated in an obvious way and similarly for the points G and G', while the point F will be eliminated by a star-polygon transformation. In particular, the network of Fig. 14 will produce an equivalent admittance between the points $B_1$ and $B'_0$ which becomes added to that shown in the circuit of Fig. 13. The same is true for the points $B'_1$ and $B_0$. Without difficulty, it will be ascertained that there exists a common condition permitting to make both the equivalent admittances between the points $B_1$ and $B'_0$ on the one hand, and the points $B'_1$ and $B_0$ on the other hand, equal to zero. This condition is expressed by $$Y_4=-\frac{m+m'}{2}Y_2 \quad (23)$$

The network having the point F as central point thus permits by a judicious choice for the value of the admittance $Y_4$ the elimination of any coupling between the points $B_1$ and $B'_0$ and between the points $B'_1$ and $B_0$. However, this star network introduces a coupling between the points $B_1$ and $B_0$ on the one hand, and the points $B'_1$ and $B'_0$ on the other hand. Without the BUN network, the coding network does not introduce such couplings. The purpose of the star networks individual to each of the two groups of points B is therefore to neutralise these undesirable couplings introduced by the first part of the neutralising network. Without difficulty one will establish that the condition permitting to obtain a zero equivalent admittance between the points $B_1$ and $B_0$ is $$Y_6=-\frac{m}{m+m'}Y_4=\frac{m}{2}Y_2 \quad (24)$$

In an analogous manner, the condition permitting to obtain an equivalent admittance equal to zero between the points $B'_1$ and $B'_0$ is $$Y'_6=-\frac{m'}{m+m'}Y_4=\frac{m'}{2}Y_2 \quad (25)$$

It still remains that the equivalent network of Fig. 14 produces an admittance between the points $B_1$ and $B'_1$. It also produces an equivalent admittance between the points $B_0$ and $B'_0$, which will therefore come in addition to that already produced between these points by the equivalent network of Fig. 13. Insofar as the equivalent admittance between the points $B_0$ and $B'_0$ is concerned, it must not be taken into consideration as soon as the conditions expressed by the Relations 23, 24 and 25 are observed, since the points $B_0$ and $B'_0$ are then completely decoupled with respect to the signal source. Insofar as the equivalent admittance between the points $B_1$ and $B'_1$ is concerned, it is also not necessary to take it into consideration when the above mentioned relations are satisfied, since in that case Fig. 13 clearly indicates that the points $B_1$ and $B'_1$ are at the same potential.

In joining these two points, the complete equivalent circuit when the above relations are satisfied therefore corresponds to the circuit shown in Fig. 15. The equivalent circuit is thus reduced to a simple admittance of value $2Y_2$, which may be entirely reactive, connecting the source to the two detectors which must be activated to characterise the A point to which the source is applied. If one had considered the admittances of the various points with respect to ground, one would of course have obtained a quadripole connecting the source to the detectors to be activated.

Having shown by this example that the neutralisation may also be applied to non-symmetrical arrangements, it is also interesting to consider the case where the number of elements forming a group may be modified from time to time. The case may arise for instance in the identification of lines in a telephone exchange when the number of lines in the exchange increases. For instance, one may initially provide for 400 lines the identification of which will be made with the help of three groups of detectors, the first and the second groups each comprising 10 detectors and a third group only 4. If the number of lines increases, one must increase the number of detectors in the third group which may for instance become 6 if one reaches a 600 line exchange. The simple example of Fig. 12 and the corresponding Relations 23, 24 and 25 indicate that if $m'$ for instance is modified, $Y_4$ and $Y'_6$ must be modified. If the admittances $Y_2$ are constituted by condensers, it is evident that the admittances $Y_6$ and $Y'_6$ shall also be condensers, but that the admittance constituting $Y_4$ shall have to be an inductance. Consequently, when $m'$ is modified, one will have to change $m'$ condensers and $m+m'$ inductances. If one considers that it is not desirable to have for each change in value of $m'$, to change $m+m'$ inductances which are in general more costly elements than the condensers, the BUN neutralising network of Fig. 12 can be slightly modified in order to avoid the replacement of all the $m+m'$ inductances each time that $m'$ is changed.

Fig. 16 represents the modified BUN network. The network is analogous to that shown in Fig. 12 except for the fact that the point F has been duplicated into two points F and F' interconnected by a single admittance $Y_{40}$.

The equivalent circuit of the BUN network of Fig. 16 shall therefore be established in the manner represented in Fig. 17. As the equivalent circuit of Fig. 14 was grafted on that of Fig. 13, that of Fig. 17 will be grafted on that of Fig. 13.

The common condition permitting to render both the equivalent admittance between the points $B_1$ and $B'_0$ and that between the points $B'_1$ and $B_0$ nil, can now be expressed by $$\frac{Y_2}{2}+\frac{Y_4Y_{40}}{mm'Y_4+(m+m')Y_{40}}=0 \quad (26)$$

which therefore replaces the Relation 23. In order to make the value $Y_4$, which corresponds to $m+m'$ elements, independent of the value of $m'$, one will choose $$Y_4=-mY_2 \quad (27)$$

which corresponds to Relation 23 in the case where $m'$ is equal to m. The Relations 26 and 27 give $$Y_{40}=-\frac{m^2m'}{m-m'}Y_2 \quad (28)$$

On the other hand, the respective conditions permitting to annul the equivalent admittances between the points $B_1$ and $B_0$ on the one hand, and the points $B'_1$ and $B'_0$ on the other hand become $$Y_6=-\frac{mY_4(Y_{40}+m'Y_4)}{(m+m')Y_{40}+mm'Y_4}=\frac{2m-m'}{2}Y_2 \qquad (29)$$

$$Y'_6=-\frac{m'Y_4(Y_{40}+mY_4)}{(m+m')Y_{40}+mm'Y_4}=\frac{m}{2}Y_2 \qquad (30)$$

instead of the Relations 24 and 25.

The Conditions 27, 28, 29 and 30 show that only the single admittance $Y_{40}$ and the $m$ admittances $Y_6$ are function of $m'$. In the case where $Y_2$ is constituted by a condenser, the only inductance which must be modified when $m$ varies ($m>m'>1$) is that corresponding to the admittance $Y_{40}$ interconnecting the points F and F'.

The various examples of coding systems which have already been explained above and for which it has been shown that it was each time possible to completely neutralise the undesirable back-up couplings, and to use substantially all the energy from the source to operate the detectors corresponding to the point to be identified, clearly indicate that there exist no particular restrictions as to the application of a neutralising network. However, the examples shown heretofore have all been of a type in which the connection between a point A to be identified and a corresponding detecting point B is effective by means of a single dipole directly interconnecting these two points. But, it is clear that in certain cases a coding effected in at least two stages of interconnections may be desirable. Indeed, if one considers for instance the case of a 10,000 line exchange and a one-stage coding system towards four groups of 10 detectors, each line must at least be provided with four elements such as condensers of which one goes to a detector in each of the four groups of detectors. On the other hand, if the coding network is established in at least two stages, one shall be able to limit the number of elements connected to each line to two only. One may use two series of 100 intermediate points between the 10,000 points A to be identified and the 40 points B to which the 40 detectors are connected. Each point A will be connected to an intermediate point in each group of 100 by a dipole constituted for example by a condenser. In their turn, each of the 100 intermediate points of a group of 100 points will be connected to a detector out of a first group of 10 and to a detector out of a second group of 10, each time by a single dipole which can again be constituted by a condenser. For such an arrangement, the number of elements in the coding network serving to interconnect the points A to the points B is therefore equal to $$20{,}000+400=20{,}400$$

Practically speaking, the number of elements per line has thus been reduced to 2 instead of 4. An arrangement of this type is in fact envisaged in the U.S. Patent No. 2,672,515.

Fig. 18 shows an identification network comprising two stages and provided with an adequate neutralising circuit. It is considered that there are $m^4$ points A of which each is connected by means of an admittance $Y_{21}$ to two points D, one among a first group of $m^2$ points D and the other among a second group of $m^2$ points D. As indicated by the multipling arrow adjacent to the points D shown, each of those is directly coupled to $m^2$ points A. In their turn, each of the points D is connected by means of an admittance $Y_{22}$ on the one hand to a point B out of a first group of $m$, and on the other hand point B out of another group of $m$ points B. As indicated by the multipling arrow adjacent to the points B shown, each of these is thus connected each time by means of an admittance $Y_{22}$ to $m$ points D. In the case where $m=10$, the 10,000 lines will thus be identified by the points B on the basis of 4 decimal digits and the signals at the D points will correspond to an identification on the one hand of the thousands digits associated to the hundreds digits, and on the other hand of the tens digits associated to the units digits. The BUN neutralising network comprises a first single point F which is connected to each of the 4 $m$ points B through an admittance $Y_{42}$. The BUN circuit also comprises a single point G which is connected to each of the 2 $m^2$ points D, each time by means of an admittance $Y_{41}$.

The equivalent circuit of the network of Fig. 18 will be established by the method of subdividing the various points into classes of points being at the same potential. One will consider first of all the 4 $m$ points B. Due to the symmetry of the circuit, these 4 $m$ points B are divided into a first class of 4 points $B_1$ directly connected to the point $A_5$ to which the source is applied by means of an admittance $Y_{22}$ in series with an admittance $Y_{21}$, and a second class of 4 $(m-1)$ points $B_0$ which are not directly connected to the source in this manner.

Considering now the 2 $m^2$ points D, these can be subdivided into three classes. The first class comprises the 2 points $D_2$ which are directly connected each to 2 points $B_1$ by means of an admittance $Y_{22}$. The second class of points D comprises 4 $(m-1)$ points $D_1$ which are each connected by an admittance $Y_{22}$ on the one hand to a point $B_1$ and on the other hand to a point $B_0$. Finally, the third class of D points comprises 2 $(m-1)^2$ points $D_0$ which are directly connected by an admittance $Y_{22}$ to 2 points $B_0$.

Similarly, the $m^4$ points A shall be classified into six classes in accordance with the combinations of points $D_2$, $D_1$ and $D_0$ to which they are associated. Point $A_5$ will be that directly connected by an admittance $Y_{21}$ to the two points $D_2$. Evidently, it corresponds to the point at which the energy source is applied. The table below indicates the subdivision of the points A into 6 classes in accordance with their direct connections to the points D, as well as the number of points in each class.

| | | |
|---|---|---|
| $A_5$ | $D_2D_2$ | 1 |
| $A_4$ | $D_2D_1$ | $4(m-1)$ |
| $A_3$ | $D_2D_0$ | $2(m-1)^2$ |
| $A_2$ | $D_1D_1$ | $4(m-1)^2$ |
| $A_1$ | $D_1D_0$ | $4(m-1)^3$ |
| $A_0$ | $D_0D_0$ | $(m-1)^4$ |

The subdivision of the various points B, D and A into classes of points having the same potential inside each class having been defined, the equivalent circuit of the network of Fig. 18 can be drawn. As previously, the equivalent circuit corresponding to the coding network will be shown separately, the equivalent circuit of the BUN neutralising network being shown apart in order not to complicate the figure. It will be noted that Fig. 18 does not indicate admittances towards ground neither for the A points, nor for the D points, nor for the point F, nor for the point G. These have been omitted with a view of simplification and they are not essential to obtain the neutralisation of the undesirable back-up couplings.

In Fig. 19, all the admittance values interconnecting the various points have been indicated and they correspond in a manner which will easily be verified, to the various numbers of points forming each class. By way of example, as there are 2 $(m-1)^2$ points $A_3$ and as these are defined as being connected to a point $D_2$ and a point $D_0$, the admittances between $A_3$ and $D_2$, and between $A_3$ and $D_0$ must thus be equal to 2 $(m-1)^2Y_{21}$ as indicated. It is immediately seen that the admittances respectively interconnecting the points $D_0$ and $A_0$ as well as $D_1$ and $A_2$ need not be taken into consideration. They should only be if one had introduced the admittance $Y_1$ interconnecting each A point to ground.

By eliminating the points $A_0$, $A_2$ as well as points $A_4$, $A_3$ and $A_1$, one obtains the circuit of Fig. 20 which is substantially equivalent to the circuit of Fig. 19.

The equivalent circuit of the BUN neutralising network will now be considered. The first part of this equivalent circuit corresponding to the BUN network is represented in Fig. 21. As shown by this figure, it is an equivalent network formed by the admittances $Y_{41}$ interconnecting each of the 2 $m^2$ points D to the single point G.

By a star-triangle transformation, the circuit of Fig. 21 becomes as indicated in Fig. 22. This circuit must therefore be superposed on the circuit of Fig. 20. If the relation $$m^2Y_{21}+2Y_{41}=0 \quad (31)$$

is satisfied, the superposition of the equivalent network of Fig. 22 upon the network of Fig. 20, will simultaneously entail the cancellation of the admittance interconnecting the points $D_2$, $D_1$ and $D_0$ in pairs.

Consequently, when the Relation 31 is satisfied, the superposition of the networks of Figs. 20 and 22 produces the equivalent network of Fig. 23. This last figure shows that the points $B_1$ and $B_0$ are no longer coupled except by two admittances in series by means of point $D_1$. On the other hand, it still remains to superpose the equivalent network constituted by the admittances $Y_{42}$ of the network BUN which interconnects each of the 4 $m$ points B to the single points F. This equivalent network is shown in Fig. 24.

By superposing the circuit of Fig. 24 to that of Fig. 23, one readily obtains the final equivalent network corresponding to the whole of the circuit shown in Fig. 18. If one satisfies the relation $$mY_{22}+2Y_{42}=0 \quad (32)$$

the equivalent admittance remaining between the points $B_1$ and $B_0$ is cancelled. Hence, the point $B_0$ is completely dissociated from the point $B_1$ provided that the Relations 31 and 32 are satisfied. No fraction of the input energy is derived towards the 4 $(m-1)$ detectors which do not correspond to the A point to which the energy source is applied.

The final equivalent network, after elimination of the point $D_2$, becomes that shown in Fig. 25. Source $e$ is simply connected to the 4 detectors corresponding to point $A_5$ by means of a series admittance. If $Y_{21}$ and $Y_{22}$ are constituted by condensers, this series admittance will be capacitive. On the other hand, the Relations 31 and 32 indicate that the admittances $Y_{41}$ and $Y_{42}$ are both constituted by inductances.

The circuit of Fig. 18 establishes that the neutralisation is equally applicable in the case of complex coding networks where the coding is performed in stages.

We will now consider in a more detailed manner, the nature of the elements which may be used to form the identifying networks described above, including the neutralising network incorporated in the identification circuit. If one desires to apply the arrangements described to the identification of telephone lines, it will in general be desirable that the admittance such as $Y_2$ represented in Fig. 5 should be constituted by a condenser. Indeed, in this way the A points will be insulated from one another for direct current. This permits the use of a test wire of the telephone line as input point to the identification network, while this test wire is kept available for any other D.C. signalling. For instance, it will be possible to reserve the test wire used for call metering and which is thus connected to the subscriber's message register. Further, the use of condensers for the coding network between the input points and the output points possesses the advantage that they do not dissipate energy.

Hence, the series elements of the back-up neutralising network and which are connected to the output points may be constituted by inductances. Such a neutralising network is shown in Fig. 26.

In Fig. 26 each of the output points B is connected to a single point F by means of an inductance $L_4$ which thus corresponds to the admittances $Y_4$ represented for example in Figs. 1 and 5. On the other hand, the F point is connected to ground by means of a condenser $C_5$ which thus corresponds to the admittance $Y_5$ for example in Figs. 1 and 5. The inductances $L_4$ and the condenser $C_5$ therefore form the neutralising network BUN, the coding network between the input points and the output points B not being represented. This coding network could for example be that of Fig. 1 or that of Fig. 5 or any other suitable network. In a general manner it will be assumed that the coding network is such that when the whole of the network is activated by the application of an A.C. energy source to one of the A input points, the B output points are divided into two classes of equipotential points: the first class comprising the B output points which are activated and the second class comprising all the other B points. As indicated by the multipling arrow adjacent to point F, a total of $x(y+1)$ points B is assumed, of which $x$ can become simultaneously activated, while the remaining $xy$ points are not. On this basis, one can thus represent the equivalent circuit of the neutralising network of Fig. 26.

Fig. 27 represents this equivalent network to which a condenser C has been added between the points $B_1$ and $B_0$ representing respectively the $x$ activated output points B and the $xy$ output points B which are not activated. This condenser C may thus for example correspond to the admittance which is shown in Fig. 8 as interconnecting the points $B_1$ and $B_0$. The condenser $C_5$ is not an essential element of the neutralising network. Generally, one may rather assume that it represents a parasitic capacitance between the point F and ground. In particular, the latter may result from the concentration of the various conductors interconnecting the F point to the $x(y+1)$ points B. In order to simplify the analysis, one may assume that this capacitance $C_5$ may be neglected either because it is of small value or because it will have been neutralised by placing in parallel with it an inductance interconnecting point F to ground and of such value that it forms an anti-resonant circuit with the capacitance $C_5$. Of course, there will be no particular difficulty in taking into account the value of the capacitance $C_5$, and moreover, the dipole interconnecting point F to ground may in fact be complex in order to have a particular admittance characteristic, not only in order to obtain the neutralisation of the equivalent coupling between the points $B_1$ and $B_0$, but also to obtain any desirable admittance characteristic between point $B_1$ and ground in order for example to satisfy the conditions providing the best energy efficiency.

Assuming that $C_5$ may be neglected, it is clear from the equivalent circuit of Fig. 27 that if $W_1$ represents the angular frequency of the source, the relation $$W_2^1L_4C\frac{1+y}{xy}=1 \quad (33)$$

must be satisfied in order to eliminate the equivalent coupling between the points $B_1$ and $B_0$. It is to be remarked that if one takes into account the capacitance $C_5$, two distinct angular frequencies appear as susceptible of permitting the obtaining of zero equivalent admittances between the points $B_1$ and $B_0$. However, such an arrangement will also show that there exists a frequency for which the equivalent admittance between the points $B_1$ and $B_0$ becomes infinite which is evidently the opposite to the desired result. One will therefore have to sufficiently differentiate between the frequencies for which the equivalent admittance between the points $B_1$ and $B_0$ is cancelled and that for which it becomes infinite.

The possibility to obtain a zero equivalent admittance between the points $B_1$ and $B_0$ for more than one frequency, is interesting since it envisages the use of the network at two distinct frequencies, e.g. 20 kc./s. on the one hand and 30 kc./s. on the other hand. This would permit effecting as many simultaneous identifications as there are distinct frequencies for which the equivalent admittance between the activated output points and the others becomes nil. It will only be necessary to provide as many detecting devices per output point as there are sources of different frequencies able to be applied to input points of the network.

Fig. 28, shows a possible detailed embodiment of the admittance $Y_3$ such as represented in Figs. 1 and 5 and interconnecting each output point B to ground. One has considered the case where the coding network with its neutralising network is adapted to avoid back-up couplings at two distinct frequencies. On the one hand, the B point is connected to ground by means of the primary winding of a transformer T in series with an inductance $L_{31}$ and a condenser $C_{31}$. The series combination formed by the inductance $L_{31}$ and the condenser $C_{31}$ is in parallel with condenser $C_{33}$. The secondary winding of transformer T is in series with the winding of a relay Rr and a rectifier S. We have assumed here the use of a transformer in order to be able to adapt the series impedance formed by the relay and the rectifier to an admittance value which is relatively high and which, as previously mentioned, offers the advantage to be guarded against secondary effects such as the Q factor of the inductances $L_4$ which might leave a small admittance between the points $B_1$ and $B_0$. On the other hand, the B point is also connected to ground through a parallel circuit identical to the previous one with respect to its structure, except for the use of an inductance $L_{33}$ in the place of a condenser $C_{33}$. The rectifying system is shown here in its simplest form as a half-way rectifier. One may of course use any rectifying system able to provide the best operating conditions for the relays.

The combination $L_{31}$, $C_{31}$, $C_{33}$ is able to produce a series resonance at a first frequency, and also a parallel resonance at a second frequency which must necessarily be higher than the first. On the other hand, the circuit $L_{32}$, $C_{32}$, $L_{33}$ is able to produce a parallel resonance at this first frequency and a series resonance at this second frequency higher than the first. This is well known, and these conditions will be satisfied by the relation $$\frac{L_{31}C_{31}}{L_{32}C_{32}}=\frac{C_{31}+C_{33}}{C_{33}}=\frac{L_{32}+L_{33}}{L_{32}} \tag{34}$$

Hence, for the first frequency, the second detecting circuit comprising the relay R'r will be completely decoupled from the B point and will receive substantially no energy. In an analogous manner, for the second frequency, the first detector circuit connected to the B point and comprising the relay Rr will be completely decoupled and will receive no energy.

In order to obtain a good discrimination between the two frequencies able to be used on any other frequency for which an infinite admittance may be obtained between the points $B_1$ and $B_0$, the neutralising network may be embodied as shown in Fig. 29.

In the circuit of Fig. 29, the admittance which may connect the single point F to ground will not be taken into account and it will be assumed to be zero. It is seen that each B point is connected to the F point by means of a complex dipole comprising the inductance $L_{42}$ in series with the parallel combination of the inductance $L_{41}$ and of the condenser $C_{41}$. Again, it will be assumed that there are $x$ points B activated and $xy$ which are not.

The circuit of Fig. 30 thus represents the equivalent circuit of Fig. 29 such as it is offered between the points $B_1$ and $B_0$, the condenser C between these two points again representing the equivalent admittance solely resulting from the coding network between the input A points and the output B points.

Without difficulty it will be seen that the circuit of Fig. 31 is substantially equivalent to that of Fig. 30. The circuit of Fig. 31 shows itself as a purely reactive complex dipole between the points $B_1$ and $B_0$ and comprising two inductances and two condensers. This dipole will be recognized as being one of those structures comprising two inductances and two condensers and which may have an identical characteristic, and such that there exist two parallel resonance frequencies and one series resonance frequency. Such reactive dipoles are well known and one may for example refer to the book of K. S. Johnson entitled "Transmission Circuits for Telephonic Communication (1924)" and particularly to pages 271 and 300. One will choose values for the elements $L_{41}$, $L_{42}$ and $C_{41}$ such that one obtains two parallel resonance frequencies for the circuit of Fig. 31, corresponding respectively to the first and second frequencies mentioned in relation to the circuit of Fig. 28. One will choose them also in order to obtain a good discrimination with respect to the series resonance frequency for the circuit of Fig. 31.

Until now, purely reactive elements have solely been considered for constituting the back-up neutralising network. While it is in principle desirable to use solely reactive elements both for the coding network and for the neutralising network, in order to avoid energy losses, this is not absolutely essential in what concerns the elimination of the effective admittance between the activated output points and the others.

One may for example keep condensers for constituting the coding network but use only condensers and resistances to constitute the neutralising network, the inductances being thus avoided. In a general manner, one will endeavor to constitute an RC neutralising network of low pass structure type between the points $B_1$ and $B_0$, in parallel with an RC high-pass type structure, due account being made of the equivalent condenser between these two points and resulting from the coding network.

Such structures may offer the property of providing a zero transfer admittance for a particular frequency. It is to be remarked, however, that in opposition to a purely reactive network, the equivalent coupling network between the points $B_1$ and $B_0$ shall necessarily have to be an unbalanced quadripole using ground, or a balanced quadripole when the ground return is not used, but not a simple equivalent dipole between the points $B_1$ and $B_0$.

The best known RC structure of this type is the twin T. It is however not unique and there exist many others. In particular, in the article published in the August 1948 issue of "Proceedings of the Institute of Radio Engineers" page 882, and entitled "Bridged reactance-resistance networks," G. R. Harris has described various quadripoles each comprising 3 condensers and 3 resistances and able to provide a zero transfer admittance at a particular frequency.

Fig. 32 represents a BUN neutralizing network of the of the RC type. Each of the points B is connected to a single point F by means of a T-network comprising a resistance $R_4$ connected to the point B on the one hand and on the other hand to the point F by means of the resistance $$\frac{R_4}{k}$$

The junction point of these two resistances is connected to ground by means of the condenser $C_5$. Again assuming that $x$ points B are activated and that the remaining $xy$ points are not, one may represent the equivalent circuit of the BUN network.

Fig. 33 represents this equivalent circuit to which, as previously, the equivalent condenser interconnecting the points $B_1$ and $B_0$ and resulting from the coding network has been added. The circuit essentially comprises three equivalent resistances and three equivalent condensers. It will be recognized as one described by Harris in the above mentioned article. By star-delta transformations, one will obtain the equivalent admittance between the points $B_1$ and $B_0$ and the latter may be cancelled at a particular frequency depending on the value of the various elements, and provided also that a particular relation exists between those. This may be expressed by $$C_5=\frac{1+y}{xy}(1+k)\left(1+\frac{2}{k}\right)C \tag{35}$$

On the other hand, if $W_1$ again represents the patricular angular frequency for which the equivalent admittance between the points $B_1$ and $B_0$ is nil, this frequency must answer to the condition $$W_1CR_4\frac{1+y}{xy}\left(1+\frac{2}{k}\right)\sqrt{1+k}=1 \qquad (36)$$

On the other hand, there also appears an equivalent admittance between point $B_1$ and ground, and due to the BUN neutralising network. This equivalent admittance can be expressed in the form of a conductance in parallel with a susceptance. At the frequency defined by Relation 36, and the Condition 35 being satisfied, the equivalent resistance between point $B_1$ and ground will be given by $$\frac{R_4}{x}\,\frac{2+k}{1+k} \qquad (37)$$

On the other hand, the equivalent capacitive impedance in parallel with this resistance will have for value $$\frac{R_4}{x}\,\frac{2+k}{\sqrt{1+k}} \qquad (38)$$

It will be of interest to have the equivalent resistance between the point $B_1$ and ground as large as possible in order not to uselessly dissipate energy. Hence, there will be advantage in using a high value for $R_4$. Among the other two parameters $k$ and $x$, the latter depends on the coding system used, but $k$, which expresses the ratio between the two resistances making part of each individual network to the point B, may still be chosen. A small value for $k$ is desirable.

However, by considering the Relation 35 it is seen that the value of condenser $C_5$ is directly proportional to that of C. But, if the coding network interconnects a large number of input A points to the output B points, the equivalent C condenser would result from the accumulation of a large number of condensers and may have a somewhat high value. Hence, it will generally be of interest to have $C_5$ which is a physical capacitance used for each B point at a not too high value. Among the factors which define $C_5$ with respect to C, $x$ and $y$ depend on the coding system used, but the factor dependent of $k$ can be chosen equal to $3+2\sqrt{2}$, minimum value, when $$k=\sqrt{2} \qquad (39)$$

Such a value of $k$ is still sufficiently small when one considers the equivalent resistance given by (37). It will thus be preferably chosen when it is necessary to limit the value of $C_5$.

Finally, by considering Relation 36 it is seen that if C and $R_4$ are relatively high, the operating frequency cannot be very high. If obtaining a sufficiently high operating frequency is considered as a determinant, there will thus be an interest in having the factor dependent of $k$ in the Equation 36 as small as possible. For this purpose, $k$ should have a value $$k=\frac{1+\sqrt{5}}{2} \qquad (40)$$

It will be remarked that this last value differs little from that given by Equation 39.

The neutralising RC circuits present the advantage that they do not necessitate inductances, but on the other hand they can introduce certain drawbacks and are thus of a more limited application. In particular, for the identification of telephone lines it is desirable to use an energy source at a relatively high frequency, 20 kc./s. or 30 kc./s. for example as suggested in the U.S. Patent No. 2,672,515. Indeed, such frequencies are above voice frequencies and therefore will not produce interferences, and on the other hand, it is relatively easy to bring them towards the line circuits through a test wire already used for D.C. signalling. If relays are included in series with the test wire, a shunting condenser permitting the flow of the A.C. identification current will present a higher admittance if the frequency is high. By considering the equivalent circuit of Fig. 8, it is seen that the equivalent condenser between the points $B_1$ and $B_0$ may become a very large multiple of $$\frac{C^2_2}{C_1+pC_2}$$

where $C_1$ represents the capacitance between a point A and ground and $C_2$ the condenser between a point A and a point B. If $C_1$ is a parasitic capacitance and consequently variable, particularly when selectors or finders are set on the line, $C_2$ shall have to be rather higher than $C_1$ in order that the methods of analysis described above and essentially based on the symmetry properties of the circuits remain substantially valid. On the other hand, one may introduce a physical capacitance between each point A and ground in order to be relatively independent of the variations of the parasitic capacitance between each point A and ground. If this physical capacitance is high, this will tend to reduce the condenser interconnecting the points $B_1$ and $B_0$.

The various examples described above have shown that the invention may be applied in many ways, there existing each time the possibility of neutralising the coupling between the detectors which must be activated and those which must not be. The coding network in particular, may be realized in any desirable way. For an identification of calling lines in a telephone exchange, it will for example be possible to use a single network for 10,000 lines with cascade coding and substantially corresponding to that shown in Fig. 18.

It will also be possible to divide the 10,000 lines in groups of 1000 lines for instance and to use a coding network with its individual neutralising network for each group of 1000 lines. This may for example be performed with the help of three series condensers for each line, each being connected to one detector among a group of 10, a total of 30 detectors per 1000 lines being provided. In order to reduce the number of relays one may also, by rectifying the A.C. energy at each detector, apply it each time by means of a rectifying device to two relays out of a group of five in order to obtain the said combinations corresponding to each decimal digit. This would permit diminishing the number of required relays.

The rectifiers then play a double rôle: they permit derivation of a direct current for actuating the relays and they avoid back-up between the activated relays and those which are not.

In practice one may use a full-wave rectifying system by taking a transformer whose secondary winding has its ends respectively connected to the rectifiers and whose midpoint is connected to ground.

It is to be noted that the division in groups of 1000 lines is such as to facilitate maintenance of the system. If a condenser of the coding network is damaged in such a way that it offers an open circuit, this fault may be detected when one tries to identify the corresponding line since an incomplete code will be produced. On the other hand, in order to give an alarm if a condenser is short-circuited, one may connect one of the ends of the primary winding of the transformer connected to a B point; to ground, but through an alarm relay. On this relay which may be common to a group of transformers will be branched a rather high condenser (e.g. 4 microfarads). This condenser shall constitute a short-circuit for the A.C. current, but if a condenser is short-circuited and if the test wire is a D.C. potential different from ground, the alarm relay will operate.

Finally, in order to be able to return to the circuit having requested the identity of a calling line, not only the hundreds, tens and units digits, but also that of the thousands which will be different for each of the 1000 line groups, the energy rectified to operate the 6 relays will also be used to operate a relay common to the group of a 1000 lines. This relay, just as the three groups of 5 relays corresponding to the hundreds, tens and units digits, will permit the return of the identity of the thousands digit to the requesting circuit by means of 5 conductors. There will thus be $4\times5=20$ conductors interconnecting the identifier to any requesting circuit.

In the case of the identification of lines in a telephone system where each line finder serves a well defined numerical group of lines, e.g. 100, the identification may be made in two parallel operations as is well known. The line finder set on the line to be identified will be identified with the help of a first network, while the line will be identified with the help of a second network. This system will permit to reduce the number of condensers to a little more than one per line. At the time of the identification, the oscillator will on the one hand be connected to a first test wire prolonged until the line finder sets on the line, and on the other hand to a second test wire prolonged to the line circuit. The first test wires will be multipled with the help of a condenser, a distinct multipling point being provided for each group of 100 lines. The second test wires will be multipled in the same way, a distinct multipling point being provided for each group of lines having the same tens and units digits. For a 10,000 line exchange, where one provides 10 finders per group of 100 lines, there will thus be $$1{,}000+10{,}000=11{,}000$$

condensers. The multipling points will then be connected to the detecting points through other condensers in accordance with any appropriate coding. The number of these last condensers will of course be small since there are only $100+100=200$ multipling points to be identified.

While the principles of the invention have been described above by referring to preferred embodiments, it should be understood that this description is made by way of example and does not in any way limit the scope of the invention.

What is claimed:

1. An electrical identification circuit for identifying one of a number of input circuits, which comprises a number of output circuits, a number of coding networks, each said coding network including a plurality of coupling impedances interconnecting one of said input circuits and a combination of said output circuits characteristic of the identity at that input circuit, means for connecting an alternating current source to an input circuit to be identified so that when an input circuit is to be identified, alternating current energy from said source appears via that input circuit's coding network at the output circuits of the combination of output circuits which together characterise the identity of that input circuit, and further coupling impedances arranged to provide connections among said output circuits, the arrangement of said further coupling impedances being such that the equivalent transfer impedance between any pair of said output circuits, one of which belongs to a combination of output circuits characteristic of the identity of one of said input circuits and the other of which does not belong to that combination, is substantially infinite at the frequency of the alternating current from said source, whereby when said alternating current is connected to an input circuit to be identified, substantially none of the energy from said sources reaches those output circuits which are not part of the combination of output circuits which characterize the input circuit to be identified.

2. An electrical identification circuit as claimed in claim 1, wherein the coupling impedances of said coding network and said further coupling impedances are reactive impedances, so that substantially no energy is dissipated in said coding networks and in said further coupling impedances, and so that substantially the whole of the energy supplied from said alternating current source to an input circuit can be distributed among the combination of output circuits characteristic of the identity of that input circuit.

3. An elecrical identification circuit as claimed in claim 1, wherein the coupling impedances of said coding networks are capacitive, and wherein said further coupling impedances are inductive.

4. An electrical identification circuit as claimed in claim 3, wherein said further coupling impedances comprise a pair of inductances and a condenser, said inductances disposed in series between each said output circuit and a common point, said condenser being connected in parallel with one of the inductances in each said pair of inductances.

5. An electrical identification circuit as claimed in claim 1, wherein the coupling impedances of said coding networks are capacitive and wherein said further coupling impedances comprise a pair of resistors and a condenser, each said pair of resistors disposed in series between each said output circuit and a common point, one of said condensers connected between the junction between each pair of resistors and said common point.

6. An electrical identification circuit as claimed in claim 1, wherein each of said coding networks includes a plurality of stages, so that there are at least two impedances in series between each of said input circuits and the corresponding ones of said output circuits, and in which said further coupling impedances interconnect the intermediate points of said coding networks in addition to the output circuits.

7. An electrical identification circuit as claimed in claim 1, wherein said coding networks further comprise a common return connection such as a common ground and wherein the coupling impedances thereof comprise condensers.

8. An electrical identification circuit as claimed in claim 1, further comprising additional coupling impedances, said further coupling impedances comprise inductances connected in quadripole, said output circuits and the intermediate points of said coding networks being coupled through said quadripole to common points which are common for groups of output circuits or intermediate points, the arrangement being such that said further coupling impedances do not modify the symmetry properties of said coding networks and wherein said common points are themselves interconnected or are connected to said common return connection by said additional coupling impedances, the value of all of said additional coupling impedances being so chosen as to provide an equivalent transfer impedance between any pair of output circuits of which one is a part of a combination of output circuits identifying an energized input circuit out of which the other is not part of that combination, which is substantially infinite at the frequency of said current source.

9. An electrical identification circuit as claimed in claim 1, wherein said output circuits comprise rectifying elements, said elements acting as decoupling devices and as rectifier devices for the rectification of the current reaching said output circuits.

References Cited in the file of this patent

UNITED STATES PATENTS 2,739,187 Holden ---------------- Mar. 20, 1956

FOREIGN PATENTS 709,504 Great Britain ---------- May 26, 1954